(12) United States Patent
Hall et al.

(10) Patent No.: US 9,824,568 B2
(45) Date of Patent: Nov. 21, 2017

(54) SYSTEMS AND METHODS FOR MONITORING A PROXIMITY OF A PERSONAL ITEM AND AUTOMATICALLY ASSIGNING SAFE AND UNSAFE ZONES

(71) Applicant: QUALCOMM Incorporated, San Diego, CA (US)

(72) Inventors: Eric M. Hall, San Diego, CA (US); Leonard Henry Grokop, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 13/799,486

(22) Filed: Mar. 13, 2013

(65) Prior Publication Data

US 2014/0266698 A1    Sep. 18, 2014

(51) Int. Cl.
| | | |
|---|---|---|
| G08B 1/08 | (2006.01) | |
| G08B 21/02 | (2006.01) | |
| H04W 4/02 | (2009.01) | |
| H04W 4/04 | (2009.01) | |
| H04W 12/12 | (2009.01) | |
| H04L 29/08 | (2006.01) | |

(52) U.S. Cl.
CPC .......... *G08B 21/0269* (2013.01); *H04L 67/26* (2013.01); *H04W 4/021* (2013.01); *H04W 4/023* (2013.01); *H04W 4/028* (2013.01); *H04W 4/043* (2013.01); *H04W 12/12* (2013.01)

(58) Field of Classification Search
CPC .... G08B 21/0269; H04L 67/26; H04W 4/021; H04W 4/023; H04W 4/028; H04W 4/043; H04W 12/12

USPC ................................................. 340/539.13
See application file for complete search history.

(56) References Cited

U.S. PATENT DOCUMENTS

| | | |
|---|---|---|
| 7,973,657 B2 | 7/2011 | Ayed |
| 8,112,037 B2 | 2/2012 | Ketari |
| 8,140,012 B1 | 3/2012 | Causey et al. |
| (Continued) | | |

FOREIGN PATENT DOCUMENTS

WO    WO-2009151925 A2    12/2009

OTHER PUBLICATIONS

International Search Report and Written Opinion—PCT/US2014/018622—ISA/EPO—May 16, 2014.

*Primary Examiner* — Zhen Y Wu
(74) *Attorney, Agent, or Firm* — Kilpatrick Townsend & Stockton, LLP

(57) ABSTRACT

Systems and methods for monitoring the proximity of a personal item are provided. Systems and methods as provided herein allow a computing device to monitor the proximity of a personal item by generating an alert when wireless communications between the computing device and the personal item are lost in an unsafe zone to remind a user of the computing device about the personal item in an attempt to prevent leaving the personal item in the unsafe zone, where it may be susceptible to theft or loss. The provided systems and methods also automatically assign safe zones by analyzing clusters of location data points obtained by the computing device over time to determine a home location and an office location, assigning the home location and the office location as safe zones, and assigning all other locations as unsafe. A user may further manually designate locations as safe zones.

26 Claims, 7 Drawing Sheets

(56) References Cited

U.S. PATENT DOCUMENTS

| | | | |
|---|---|---|---|
| 8,244,468 B2 | 8/2012 | Scalisi et al. | |
| RE43,809 E | 11/2012 | Krstulich | |
| 2002/0102990 A1 | 8/2002 | Alberth et al. | |
| 2002/0196147 A1* | 12/2002 | Lau | G08B 21/028 340/573.1 |
| 2003/0017821 A1* | 1/2003 | Irvin | H04W 4/02 455/410 |
| 2003/0117821 A1* | 6/2003 | Amels | H02M 1/12 363/124 |
| 2004/0166880 A1* | 8/2004 | Horikami | B60L 3/0038 455/456.1 |
| 2004/0172277 A1* | 9/2004 | Dione | G06Q 30/02 705/324 |
| 2006/0202840 A1* | 9/2006 | Korbonski | G08B 21/0202 340/573.4 |
| 2007/0018914 A1 | 1/2007 | Kim et al. | |
| 2007/0026842 A1* | 2/2007 | Haave | B60R 25/102 455/404.2 |
| 2007/0188318 A1* | 8/2007 | Cole | G06Q 10/08 340/539.13 |
| 2008/0012423 A1* | 1/2008 | Mimran | H01R 25/003 307/11 |
| 2010/0253506 A1* | 10/2010 | Teran-Matus | G08B 13/2462 340/539.13 |
| 2010/0265931 A1* | 10/2010 | Loc | G08B 21/0266 370/338 |
| 2011/0039623 A1* | 2/2011 | Levenson | A63F 13/60 463/42 |
| 2011/0148625 A1* | 6/2011 | Velusamy | G08B 13/1427 340/539.13 |
| 2012/0178476 A1* | 7/2012 | Ortiz | H04W 4/025 455/456.6 |
| 2012/0214507 A1* | 8/2012 | Vartanian | G01S 15/08 455/456.1 |
| 2013/0005354 A1 | 1/2013 | Sheilendra | |
| 2013/0007636 A1* | 1/2013 | Boss | G06F 3/011 715/757 |
| 2013/0120141 A1* | 5/2013 | Scalisi | G01C 21/165 340/539.13 |
| 2013/0124463 A1* | 5/2013 | Lee | G06F 17/30575 707/610 |
| 2013/0159214 A1* | 6/2013 | Boling | G06Q 40/06 705/36 R |
| 2014/0012545 A1* | 1/2014 | Tsongas | G06F 17/5004 703/1 |
| 2014/0067249 A1* | 3/2014 | Gagliardi | G08G 3/02 701/301 |
| 2014/0104063 A1* | 4/2014 | Troxler | G01C 21/005 340/573.3 |

* cited by examiner

SYSTEMS AND METHODS FOR MONITORING A PROXIMITY OF A PERSONAL ITEM AND AUTOMATICALLY ASSIGNING SAFE AND UNSAFE ZONES

BACKGROUND

Aspects of the disclosure relate to systems and methods for monitoring a proximity of a personal item. In particular, embodiments disclosed herein are directed to systems and methods that automatically assign safe and unsafe zones based on clustered places of relevance for a user such that an alert may be generated when a user leaves the personal item in an unsafe zone, but does not generate an alert when the user leaves the personal item in an unsafe zone.

The loss of an item, whether through theft or forgetfulness, is something that most people deal with at least once. For unimportant or inexpensive items, this loss can usually be absorbed easily by replacing the item. However, for expensive or important items, the loss may be more difficult to recover from. Moreover, in cases where the lost item is an electronic device that stores data, the loss can be particularly damaging because of not only the loss of the device, but the loss of the stored data, which may have importance for a person's job or for a person's identity or finances. Consequently, there is a need for preventing the loss of a person's personal items.

However, sometimes a person leaves behind an item intentionally with the intent to retrieve it later or because the person believes that the item is being left in a safe location. Thus, a loss prevention system or device should be configurable to distinguish between a true loss of an item or an intentional placement of an item. However, configuring safe and unsafe locations takes time and effort, and may not properly be performed by a user. Consequently, the configuring of safe and unsafe locations should be performed automatically based on a user's past location history.

Accordingly, there is a need for systems, devices, and methods for preventing the loss of a person's personal items that is configurable and allows for a person to distinguish between a true loss in an unsafe zone and an intentional placement of the personal item in a safe zone, wherein safe zones and unsafe zones are automatically determined based on a user's location history.

BRIEF SUMMARY

Consistent with some embodiments, there is provided a device for monitoring a proximity of a personal item. The device includes one or more wireless transceivers configured to communicate wirelessly with the personal item, a location sensor configured to determine a location of the device, and memory storing the determined location. The device also includes one or more processors configured to cluster determined locations into location clusters, automatically assign safe zones based on the location clusters, and generate an alert when the wireless communications with the personal item are lost and the device is not in a safe zone.

Consistent with some embodiments, there is also provided a method for monitoring a proximity of a personal item. The method includes steps of establishing, by wireless transceivers of a computing device, wireless communications with the personal item, automatically assigning, by one or more processors of the computing device safe zones based on clustered locations in which the computing device has been, monitoring the wireless communications with the personal item, and when the wireless communications with the personal item are lost, determining a location and generating an alert when the determined location is not a safe zone.

Consistent with some embodiments, there is further provided a method. The method includes steps of determining, by one or more processors of a computing device, a home location cluster, determining, by the one or more processors, a work location cluster, determining, by the one or more processors, an office location cluster within the work location cluster, assigning the home location cluster and the office location cluster as safe zones, and generating an alert when wireless communications between the computing device and a personal item are lost and the computing device is not located in a safe zone. The method may also be embodied in a computer-readable medium.

Consistent with some embodiments, there is further provided a system for monitoring proximity of a personal item. The system includes means for determining a home location cluster, means for determining a work location cluster, and means for determining an office location cluster within the work location cluster. The system also includes means for assigning the home location cluster and the office location cluster as safe zones, and means for generating an alert when wireless communications between the computing device and the personal item are lost and the computing device is not located in a safe zone.

BRIEF DESCRIPTION OF THE DRAWINGS

Aspects of the disclosure are illustrated by way of example. In the accompanying figures, like reference numbers indicate similar elements, and.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Figure 1:
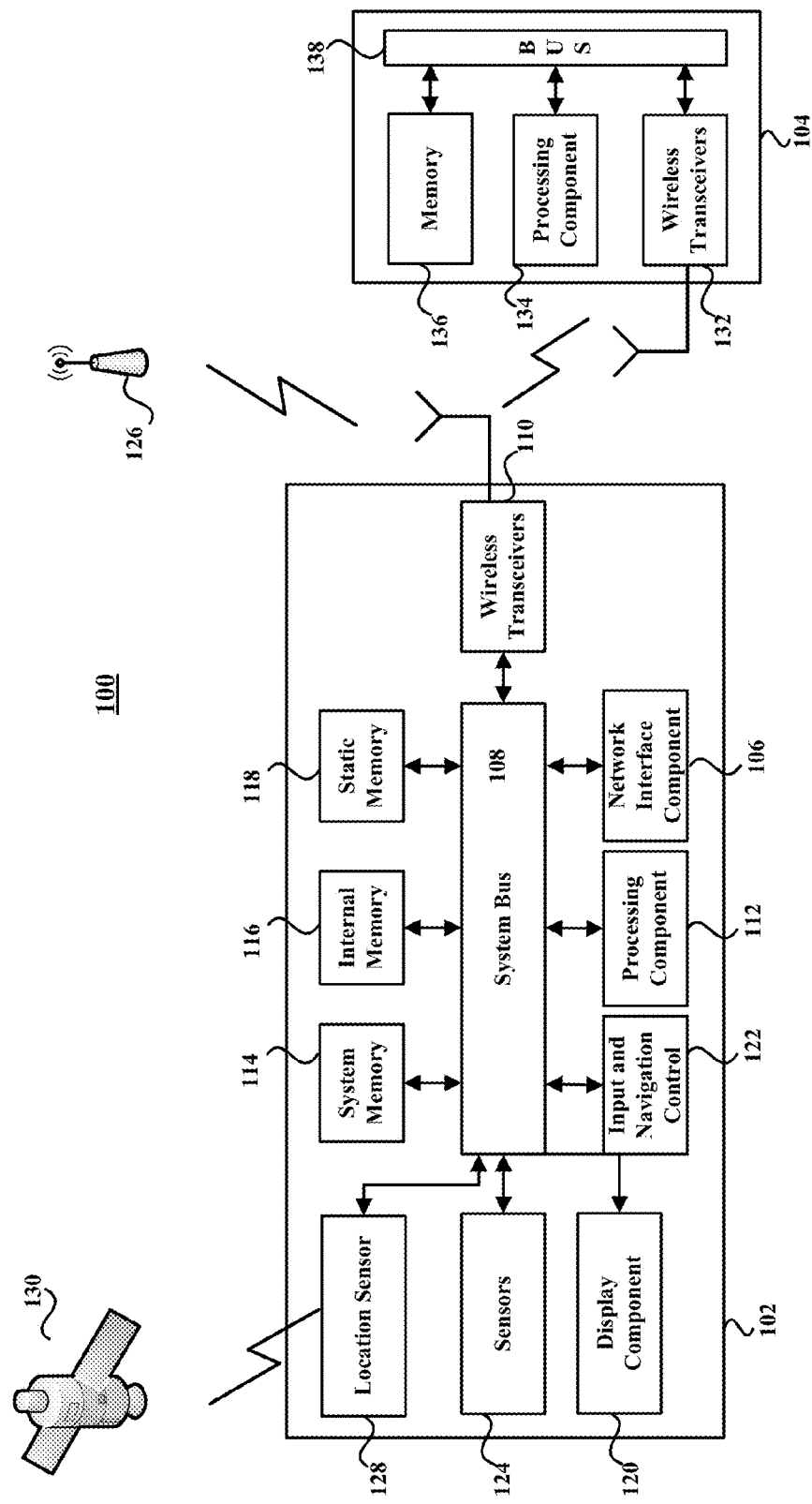
FIG. 1 is a diagram illustrating a system for monitoring a proximity of a personal item, consistent with some embodiments.

FIG. 1 is a diagram illustrating a system for monitoring a proximity of a personal item, consistent with some embodiments. As shown in FIG. 1, system 100 includes a computing device 102 and personal item 104. Computing device 102 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™. Computing device 102 may also be a tablet computer, such as an iPad™ or other tablet computer running one of the aforementioned operating systems. Computing device 102 may also be PCs or laptops or netbooks. In some embodiments, computing device 102 is a device that is either with a user most of the time or near a user most of the time.

According to some embodiments, computing device 102 may be implemented using any appropriate combination of hardware and/or software configured for, among other things, monitoring a proximity of personal item 104 that includes maintaining wireless communications with personal item 104 when personal item 104 is within a predetermined distance of computing device 102 and generating and displaying an alert when the wireless communications with personal item 104 are disrupted and the personal item 104 is determined to be in an unsafe zone. In particular, computing device 102 may include any appropriate combination of hardware and/or software having one or more processors and capable of reading instructions stored on a non-transitory machine-readable medium for execution by the one or more processors for, among other things, automatically determining when personal item 104 is in a safe or unsafe zone, maintaining the wireless communications with personal item 104, and alerting a user when wireless communications with personal item 104 are disrupted or otherwise lost. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read.

Computing device 102 may include network interface component 106 configured for communication with a network. Consistent with some embodiments, network interface component 106 may be configured to interface with a coaxial cable, a fiber optic cable, a digital subscriber line (DSL) modem, a public switched telephone network (PSTN) modem, an Ethernet device, and/or various other types of wired network communication devices. Network interface component 106 may be coupled through system bus 108 to one or more wireless transceivers 110, wherein each wireless transceiver 110 may include an antenna that is separable or integral and is capable of transmitting and receiving information according to a different wireless networking protocol, such as Wi-Fi™, 3G, 4G, HDSPA, LTE, RF, NFC, Bluetooth™, and Zigbee™.

System bus 108 interconnects various components within computing device 102 and communication information between the various components. Such components include a processing component 112, which may be one or more processors, central processing units (CPUs), micro-controllers, or digital signal processors (DSPs), a system memory component 114, which may correspond to random access memory (RAM), an internal memory component 116, which may correspond to read only memory (ROM) and/or firmware, and an static or external memory 118, which may correspond to optical, magnetic, or solid-state memories.

Consistent with some embodiments, computing device 102 may also include a display component 120 for displaying information to a user. Display component 120 may be a liquid crystal display (LCD) screen, an organic light emitting diode (OLED) screen (including active matrix AMO-LED screens), an LED screen, a plasma display, or a cathode ray tube (CRT) display. Display component 120 may be integrated with computing device 102, or may be separate from computing device 102 and coupled to computing device 102. Computing device 102 may also include an input and navigation control component 122, allowing for a user to input information and navigate along display component 120. An input and navigation component 122 may include, for example, a keyboard or key pad, whether physical or virtual, a mouse, a trackball, or other such device, or a capacitive sensor-based touch screen.

Computing device 102 may also include one or more sensors 124 that capture data associated with computing device 102 and/or its surroundings. Sensors 124 may include, but are not limited to, microphones or audio sensors, cameras, light sensors, proximity sensors, pressure sensors, inertial sensors (e.g., accelerometers and/or gyroscopes), magnetometers, etc. Sensors 124 may be used individually or in combinations, such as sensor arrays or any other combinations. Sensors 124 are capable of operating interdependently or independently of one another. Sensors 124 may communicate with processing component 112 through system bus 108 in order to process data captured by sensors 124 consistent with instructions stored in any of memories 114, 116, and 118 and to generate or otherwise obtain metadata associated with captured data. In some embodiments, wireless transceivers 110 may also be utilized as sensors, for example to sense or detect wireless signals such as Wi-Fi signals from wireless access points 126, and to detect wireless communications, or lack thereof, with personal item 104.

Computing device 102 may also include location sensors 128. Consistent with some embodiments, location sensors 128 may include global positioning system (GPS) sensors in communication with GPS satellites 130 for determining a location of computing device 102. Location sensors 128 may also cooperate with network interface component 106 to determine a location of computing device 102 based on an internet protocol (IP) address of computing device 102 when computing device 102 is in communication with a network. Location sensors 128 may also cooperate with wireless transceivers 110, network interface component 106, and sensors 124 to determine a location of computing device 102 based on data captured by sensors about the surroundings of computing device 102 and/or wireless access points 126 and other wireless communication points that wireless transceivers 110 are in communication with.

Although the components of computing device 102 are shown as being integral with computing device 102, the components are not so limited and may be separate from and external to computing device 102, and coupled to computing device 102 and system bus 108 via a wired or wireless coupling.

Personal item 104 includes one or more wireless transceivers 132, wherein each wireless transceiver 110 may include an antenna that is separable or integral and is capable of transmitting and receiving information according to a different wireless networking protocol, such as Wi-Fi™, 3G, 4G, HDSPA, LTE, RF, NFC, Bluetooth™, and Zigbee™. According to some embodiments, wireless transceivers 132 may be configured to be in wireless communication with wireless transceivers 110 of computing device 102 when personal item 104 and computing device 102 are within a predetermined distance of one another. This wireless communication, or pairing, may have a predetermined distance between personal item 104 and computing device 102 determined by the wireless networking protocol. When personal item 104 and computing device 102 are no longer within the predetermined distance from one another, the wireless communications, or pairing, will be disrupted and lost, allowing computing device 102 to monitor a proximity of personal item 104 by monitoring the wireless communications therebetween.

Personal item 104 may also include a processing component 134, and a memory 136 coupled to each other and wireless transceivers 132 over a bus 138. Processing component 134 may be one or more processors, central processing units (CPUs), micro-controllers, or digital signal processors (DSPs), and memory 136 may include instructions that may be executed by processing component 134. According to some embodiments, personal item 104 may be a computing device such as computing device 102 and, thus, may include similar elements such as shown in computing device 102 although not shown herein. In such embodiments, personal item 104 may correspond to a mobile device, such as a smartphone, a tablet computer, or a laptop or notebook computer. Personal item 104 may also correspond to other peripheral devices capable of being in wireless communication with computing device 102, such as a head mounted display (HMD) or a wireless-capable camera. Personal item 104 may also correspond to a device capable of being attached or affixed to an item that is not typically capable of being in wireless communication with computing device, such as a briefcase, backpack, gym bag, purse, wallet, etc.

According to some embodiments, personal item 104 may include location sensors similar to location sensors 128 that determine a location of personal item 104. In other embodiments, a predetermined distance between computing device 102 and personal item 104 in which computing device 102 and personal item 104 remain in wireless communications may be small enough such that a location of personal item 104 may be assumed to be the location of computing device 102. Personal item 104 may be any configuration of hardware and software that is configured to, at a minimum, establish and maintain wireless communications with computing device 102 so that computing device 102 can monitor a proximity of personal item 104.

According to some embodiments, processing component 112 may execute instructions stored in any of memories 114, 116, and 118 for monitoring a proximity of personal item 104 by establishing wireless communications with personal item 104, and generating an alert when the wireless communications with personal item 104 are disrupted and lost. Further, any of memories 114, 116, and 118 may include places of relevance determined by clustered locations that are determined to be safe zones, such that processing component 112 does not generate an alert if wireless communications with personal item 104 are disrupted and lost in a safe zone. Safe zones may include locations such as a home and office of a user, and may be automatically determined by monitoring a location of computing device 102 and clustering the locations to determine places of relevance, and may also be indicated by a user.

A place of relevance (PoR) may be any physical location and/or an area that is significant to a person, who may, for instance, be a user of computing device 102. Whether a particular place is significant to the user may depend on and/or be measured by a period of time that the user spends in the physical location and/or area corresponding to the particular place. Thus, computing device 102 may determine that a particular place is a PoR if a user of computing device 102 (and correspondingly, computing device 102 itself) remains stationary and/or spends a sufficiently long period of time in the particular place. A PoR may be a macro PoR, such as a particular building, or a micro PoR which may be a sub-space within a building. A PoR may be represented by a cluster of data points clustered by time, location, distance, and other clustering metrics. Discovering places of relevance are further discussed in U.S. patent application Ser. No. 13/627,823 Qualcomm Reference No. 120019, filed on Sep. 26, 2012, the contents of which are hereby incorporated by reference in their entirety.

Consistent with some embodiments, places of relevance may be defined separately for different users. For example, PoRs may be defined separately for each user of one or more computing devices 102 based on an amount of time spent in each place, based on one or more labels that may be defined and/or otherwise provided for various places (e.g., including user-defined labels), and/or based on one or more functions that may be defined for various places (e.g., including user-customizable location-aware functionalities). Thus, PoRs, including micro PoRs and macro PoRs, might not be universal, but instead may vary. In some instances, however, at least some places of relevance, including micro places of relevance and/or macro places of relevance, may be shared across different users (e.g., different users of the same device, different users of different devices, etc.). For example, some places of relevance may be shared across users when places of relevance information is crowd-sourced from a number of users (e.g., where a number of users and/or a number of devices provide places of relevance information to one or more central servers for sharing with other users and/or other devices). In addition, a place of relevance may be different and/or separate from a known place of interest in some instances, but in some embodiments, a place of relevance also may be the same as a known place of interest. Micro places of relevance with macro places of relevance are described in detail in U.S. patent application Ser. No. 13/629,202, Qualcomm Reference No. 113455, filed on Sep. 27, 2012, the contents of which are hereby incorporated by reference in their entirety.

Figure 2:
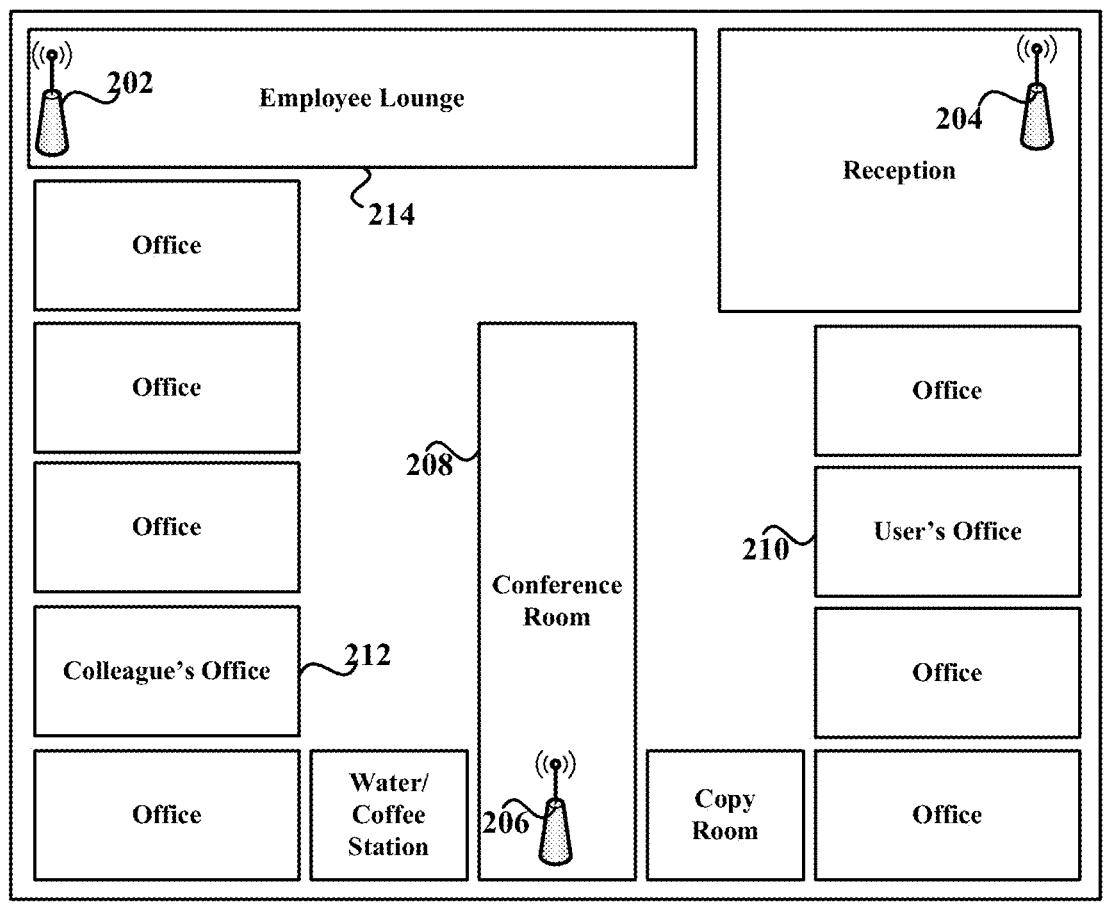
FIG. 2 is a diagram illustrating micro places of relevance within a macro place of relevance, consistent with some embodiments.

However, to better understand the concept of macro places of relevance and micro places of relevance, FIG. 2 is a diagram illustrating micro places of relevance (micro PoRs) within a macro place of relevance (macro PoR). Consistent with some embodiments, macro PoR 200 may correspond to a floor of an office building, may correspond to a cluster of locations in which a user of computing device 102 spends more time at than some other location clusters and, thus, may correspond to the office of a user of computing device 102 having personal item 104. Macro PoR 200 may include a number of discrete sub-spaces, including a reception area, several offices, a conference room, and an employee lounge, among other things, as well as several wireless access points (e.g., access point 202, access point 204, and access point 206). Consistent with some embodiments, the sub-spaces may individually or in combination be a micro PoR that is associated with macro PoR 200. In some embodiments, macro PoR 200 may comprise the entire office building or multiple floors of the office building, and the micro PoRs may be distributed across the different floors.

In some embodiments, computing device 102 visiting macro PoR 200 may determine that a particular wireless network fingerprint is associated with a particular micro PoR that is included in macro PoR 200. For example, based on signal information stored by computing device 102, the processing component 112 of computing device 102 may determine whether the particular wireless network fingerprint has been previously encountered, and accordingly, whether a micro PoR corresponding to the wireless network fingerprint has been previously visited. If, for instance, the micro PoR has been previously visited, then information about the micro PoR may already be stored in a cluster model for macro PoR 200. Such information may, for instance, indicate a label or name previously assigned to the micro PoR, such as "OFFICE" or "COLLEAGUE OFFICE". Moreover, such information may also correspond to a designation as to whether the micro PoR is a safe zone or an unsafe zone.

Computing device 102 may, for example, be configured to recognize conference room 208 as a micro PoR, based, for instance, on a particular wireless network fingerprint that is present and/or detectable when computing device 102 is in conference room 208. Computing device 102 may, for example, be configured to recognize user office 210 as a micro PoR based on, for example, a particular wireless network fingerprint provided by WAPs 202, 204, and 206. Computing device 102 may also be configured to recognize user office 210 as being a safe zone wherein a user is comfortable leaving personal item 104. Computing device 102 may also be configured to recognize colleague's office 212 as a micro PoR based on the wireless network fingerprint provided by WAPs 202, 204, 206. Computing device 102 may further be configured to recognize colleague's office 212 as a safe zone or an unsafe zone depending on a preference of the user.

A user of computing device 102 may be able to create a label for each micro PoR in macro PoR 200. Once the user provides a name or label for a micro PoR, the mobile device may generate and/or store information describing the wireless network fingerprint that is detectable in the micro PoR, along with the or label and/or other information associated with the micro place of relevance, such as whether the micro PoR is a safe or unsafe zone. Thereafter, when the user of computing device 102 visits a micro PoR in macro PoR in future instances, computing device 102 may be able to determine that the micro PoR is being visited based on the particular wireless network fingerprint that is present and/or detectable by computing device 102. In addition, based on determining that the micro PoR is being visited, computing device 102 may also determine whether the micro PoR is a safe zone or an unsafe zone and, based on a determination that the micro PoR is an unsafe zone, generate an alert when wireless communications with personal item 104 are disrupted and lost indicative of, for example, user leaving personal item 104 in employee lounge 214. However, if computing device 102 determines that personal item 104 was last located in user's office 210, which may be labeled as a safe zone, an alert may not be generated when wireless communications with personal item 104 are disrupted or lost. Consistent with some embodiments, computing device 102 may generate a reminder to a user instead of an alert, which is displayed by display component 120 and informs the user of computing device 102 that personal item 104 has been left in user office 210.

While the examples discussed above and illustrated in FIG. 2, describe an example situation in which a macro PoR is the size of an office building and corresponding micro PoRs are sub-spaces in the office building, the sizes and/or scale of various PoRs may be different in other arrangements. For instance, in one example, a macro PoR may be an office campus that includes a number of buildings (e.g., three, four, five, etc.), and each building may be a micro PoR. Furthermore, while each building may be a micro PoR in one place model, in this example, one or more other place models also may be defined for the same physical space and used by computing device 102. In one or more of these other place models, each building (e.g., each building that is a micro place of relevance in the first place model) may be a macro PoR in another place model that, in turn, may include a number of micro PoRs. These micro PoRs may, for example, be defined with respect to the PoR associated with the particular building of the office campus.

Figure 3:
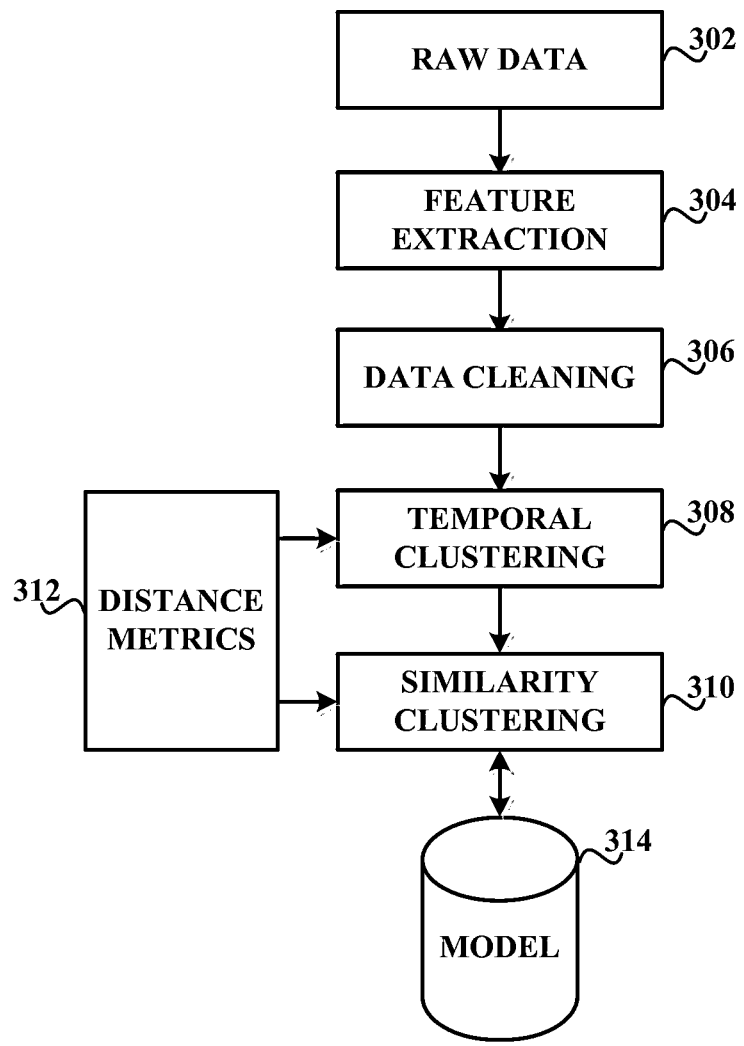
FIG. 3 is a flowchart illustrating clustering locations to determine places of relevance, consistent with some embodiments.

FIG. 3 is a flowchart illustrating clustering locations to determine places of relevance, consistent with some embodiments. According to some embodiments, the method 300 shown in FIG. 3 may be embodied in processor-executable instructions stored in any one of memories 114, 116, and 118, for execution by processing component 112. Method 300 may also be embodied in a system of modules configured for performing steps of method 300. As shown in FIG. 3, raw data is received from device data sources 302, which may include, but are not limited to, wireless transceivers 110, sensors 124, location sensor 128, and sources of time/day information such as a system clock or other mechanisms. Raw data collected from the device data sources 302 can take any form usable for clustering, such as GPS readings from the location sensors 128, network strength and/or other network-related readings forming wireless network fingerprints from wireless transceivers 110, motion, acceleration, orientation, or other data from the sensors 124, and a time associated with the data from a system clock.

From the raw data, features are extracted 304. Extracted features 304 may include latitude/longitude coordinates obtained through location fixes from location sensor 128. Extracted features 304 may include wireless network fingerprints that may include sets of visible Wi-Fi access points, their respective received signal strengths, e.g., given as a signal strength indication (RSSI), and their respective response rates (i.e., the fraction of the time they are visible when successive scans take place). Wireless network fingerprints may also include Bluetooth™, Zigbee™, or other wireless network fingerprints, that may include sets of visible Bluetooth™ devices, their respective signal strengths (e.g., given as RSSI), their device classes, and their respective response rates.

After features are extracted 304, the data from the extracted features are cleaned 306. Consistent with some embodiments, cleaning the data from the extracted features may include removing any data that appears to be statistical outliers. Statistical outliers may correspond to latitude/longitude coordinates obtained by performing GPS fixes or wireless network fingerprints that are very far from previous latitude/longitude coordinates or wireless network fingerprints. Statistical outliers may also include latitude/longitude coordinates or wireless network fingerprints that have a poor accuracy value associated with them, for example, an accuracy of greater than 200 m. Temporal clustering 308 and similarity clustering 310 are then performed based on distance metric inputs 312. Clustering refers to grouping data points that appear similar in some feature space and/or that occur at similar times. For example, if the data consists of a trace of latitude/longitude coordinates obtained by performing GPS fixes, clustering may involve grouping the fixes into a finite number of places at which the user visits and spends time. Thus, one distinct segment of consecutive fixes may correspond to a user being at home, and may belong to the same cluster as a second distinct segment of consecutive fixes that occurs on a different day when the user is again at home. Another cluster may correspond to fixes obtained when the user is at work. An illustration of data point clustering is given by diagram 400 in FIG. 4. Clusters may be based on any criteria, and in some cases may be defined arbitrarily for a given data stream.

Consistent with some embodiments, clustering is performed on GPS coordinates and on wireless network fingerprints indicative of location data points. GPS coordinates include a latitude and longitude tuple (lat,long) determined from location sensor 128 in communication with GPS satellite 130. A distance between two (lat,long) tuples is calculated along the geodesic between the two points. Wireless network fingerprints include a list of visible wireless access points (WAPs) 126 and their RSSIs. A distance between two wireless network fingerprints $x=[x_1, x_2, \ldots]$ and $y=[y_1, y_2, \ldots]$ may be determined based on the Tanimoto coefficient:

$$d(x, y) = \frac{x \cdot y}{|x|^2 + |y|^2 - x \cdot y}$$

where $$x \cdot y = \sum_i x_i y_i$$

and $|x|^2 = x \cdot x$. Here $x_i$=RSSI–MIN_RSSI for the 1st fingerprint of the i-th WAP 126 both fingerprints have in common. Similarly $y_i$=RSSI–MIN_RSSI in the 2nd fingerprint of the i-th WAP 126 both fingerprints have in common. According to some embodiments, a typical value of MIN_RSSI=–101 dB. RSSI ranges from about –101 dB to –20 dB. The GPS data is clustered in an on line fashion to produce a list of N macro clusters Ma1, Ma2, . . . MaN. Similarly, the wireless network data is clustered in an on line fashion to produce a list of micro clusters Mi1, Mi2, . . . MiM. Various clustering techniques can be used, however method 300 uses temporal clustering 308 and similarity clustering 310 based on distance metrics 312.

Figure 4:
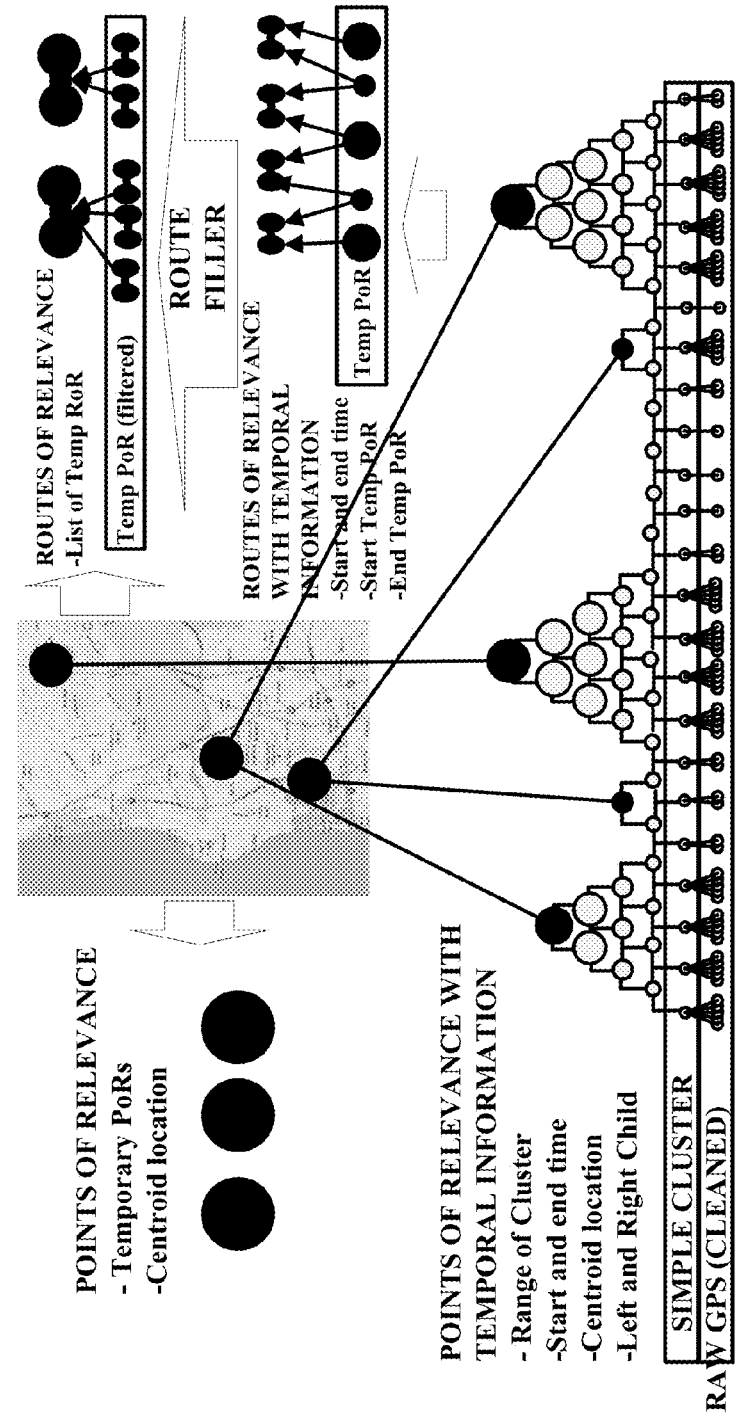
FIG. 4 is a diagram illustrating location data point clustering, consistent with some embodiments.

Temporal clustering 308 includes periodically collecting location data points and comparing adjacent data points, and an example is shown in diagram 400 in FIG. 4. For example, every minute n a new wireless network fingerprint and/or GPS (lat,long) tuple may be collected as a data point Dn. A distance between Dn and Dn–1 is then determined. If is determined to be less than a predetermined value, Dn and Dn–1 are determined to be sufficiently close and placed in a cluster. However, if is determined to be more than the predetermined value, Dn and Dn–1 are determined to sufficiently different and Dn is placed in a new cluster. Higher levels of clustering occur wherein centroids of the created clusters are compared to determine if they are within a predetermined distance, and merged if they are. These comparisons continue at higher levels until no further clusters are merged. Similarity clustering 310 applies additional distance metrics 312 to the temporal clusters created by temporal clustering 308 and merges any two clusters that are sufficiently close in distance. In some embodiments, the additional distance metrics 312 that may be applied include a geodesic distance for latitude/longitude data and, for wireless network fingerprints, a distance determined by the above-described Tanimoto coefficient. The merged clusters are stored in model 314. Both micro clusters MiM and macro clusters MaN are determined using method 300 and stored in model 314, which may be used to determine PoRs.

Model 314 is composed of micro and macro clusters, and each macro and micro cluster may include statistics that may be useful for determining a PoR and a label to be assigned to the PoR, yielding a model mapping between PoRs and their labels. Further, the labels may be used to automatically or manually assign clusters as being safe zones or unsafe zones. Consistent with some embodiments, the clusters stored in model 314 may be automatically assigned labels by computing device 102 based on instructions stored in any of memories 114, 116, and 118.

Figure 5:
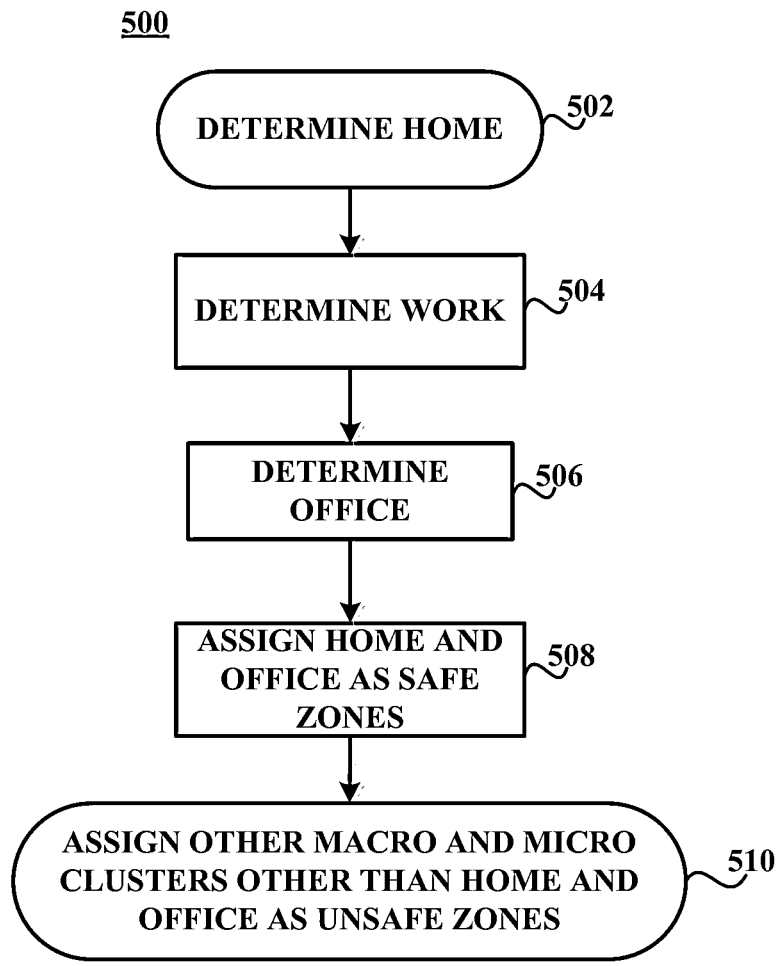
FIG. 5 is a flowchart illustrating a method for automatically assigning clusters as being safe zones, consistent with some embodiments.

FIG. 5 is a flowchart illustrating a method for automatically assigning clusters as being safe zones, consistent with some embodiments. For the purpose of illustration, FIG. 5 will be described with reference to any of FIGS. 1-4. The method shown in FIG. 5 may be embodied in computer-readable instructions for execution by one or more processors in processing component 112 of computing device 102. As shown in FIG. 5, method 500 begins by determining which clusters stored in model 314 corresponds to a place of relevance that may be a user's home (502). Consistent with some embodiments, a place of relevance that may be a user's home is determined by computing, for each macro cluster, the fraction of time computing device 102 is in the cluster at a particular time, for example 3 AM. The cluster having the highest fraction of time in which computing device 102 is in the cluster at the particular time may then be determined as a user's home and be labeled as a "HOME" place of relevance.

Returning to FIG. 5, method 500 continues by determining which cluster stored in model 314 corresponds to a place of relevance that may be a user's workplace (504). Consistent with some embodiments, a user's workplace is determined by determining the macro cluster, other than the macro cluster determined to be a user's home, in which computing device 102 spends the most amount of time. According to other embodiments, a user's workplace may be determined by determining, for each macro cluster, the fraction of time computing device 102 is in the cluster at a particular time, for example 10 AM or 3 PM. The macro cluster having the highest fraction of time in which computing device 102 is in the cluster at the particular time may then be determined as a user's workplace. In some embodiments, a user's workplace may be determined by determining a user's home based on a particular time, as described above, and then determining the macro cluster having the second highest fraction of time in which computing device 102 is in the cluster at that particular time as a user's workplace. The macro cluster determined to be a user's workplace may then be labeled as a "WORK" place of relevance.

Returning to FIG. 5, method 500 continues by determining which micro cluster within the macro cluster determined to be a user's workplace corresponds to a micro place of relevance corresponding to a user's office (506). Consistent with some embodiments, a user's office may be determined by determining, for each micro cluster within the macro cluster determined to be a user's workplace, the fraction of time in which computing device 102 is in the micro cluster, and then determining the micro cluster having the greatest fraction as being a user's office. Consistent with some embodiments, a user's office may also be determined as the micro cluster most frequently visited when computing device 102 first enters the macro cluster. Consistent with some embodiments, a user's office may alternatively be determined as the micro cluster most frequently visited last before computing device 102 leaves the macro cluster. The micro cluster determined to be the user's office may then be labeled as an "OFFICE" place of relevance.

Figure 6:
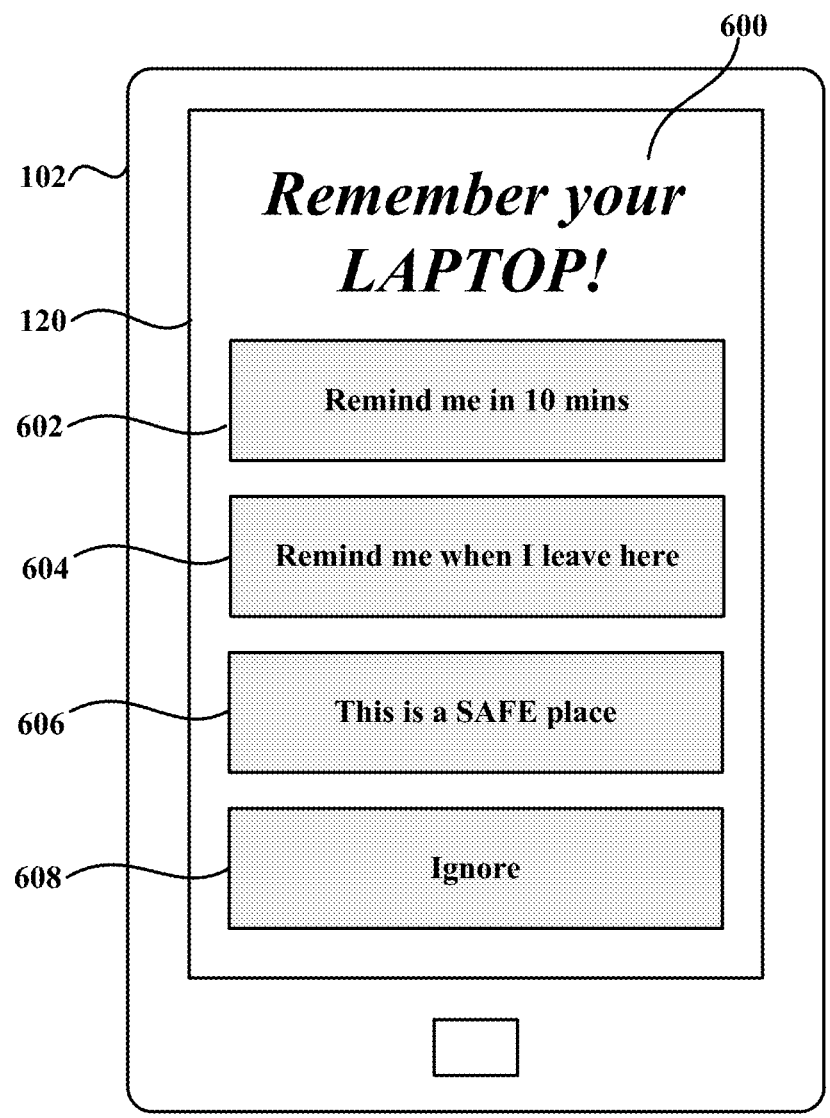
FIG. 6 is a diagram illustrating a user interface displayed on a computing device for monitoring proximity of a personal item, consistent with some embodiments.

Consistent with some embodiments, the determination of the micro and macro cluster places of relevance may be performed by computing device 102 in real time, may be initially built by computing device 102 offline based on observed or imported data 302, or may be determined by a separate device and then transmitted or loaded onto computing device 102. Returning to FIG. 5, method 500 may then assign the clustered places of relevance labeled as "HOME" and "OFFICE" as being safe zones (508). Macro clusters other than "HOME" and micro clusters other than "OFFICE", may then be assigned as unsafe zones (510). Consistent with some embodiments, computing device 102 may use the automatically assigned safe zones to determine when to generate an alert when wireless communications between computing device 102 and personal item 104 are disrupted and lost indicating that personal item 104 is no longer in proximity of computing device 102. Moreover, user may manually indicate other clustered places of relevance as being safe or unsafe zones. However, automatically assigning safe zones provides convenience for the user, and allows for easier setup for a user of system 100. Assigning and labeling location clusters are further described in U.S. Provisional Application No. 61/721,919, Qualcomm Reference No. 123819P1, filed on Nov. 2, 2012, the contents of which are hereby incorporated by reference in their entirety FIG. 6 is a diagram illustrating a user interface displayed on computing device 102 for monitoring proximity of personal item 104, consistent with some embodiments. For the purpose of illustration, FIG. 6 will be discussed with reference to at least FIGS. 2 and 5. In order to monitor proximity of personal item 104, computing device 102 establishes wireless communications with personal item 104. The wireless communication may be established by computing device 102 based on instructions stored in any of memories 114, 116, and 118 executed by processing component 112. In some embodiments, the instructions may correspond to an application. Input may be required on both computing device 102 and personal item 104 for establishing wireless communications. Such input may include a password or other security credential. According to some embodiments, the wireless communications may have a predetermined distance set by the user or associated with the type of wireless communications being used (e.g., Bluetooth™, Zigbee™, WiFi Direct™, etc.) such that when computing device 102 and personal item 104 are separated by more than the predetermined distance, the wireless communications are disrupted and lost.

Once computing device 102 has established wireless communications with personal item 104, instructions stored in any of memories 114, 116, and 118 and executed by processing component 112 may monitor the wireless communications between computing device 102 and personal item 104 such that when the wireless communications between computing device 102 and personal item 104 are disrupted and lost, processing component 112 may execute additional instructions. Such additional instructions may include determining whether the current location of computing device 102 is in a safe zone or an unsafe zone or whether a last known location of personal item 104 was in a safe zone or an unsafe zone. Processing component 112 may make such a determination by comparing a current location to assigned safe and unsafe zones determined by method 500. If processing component 112 determines that the current location of computing device 102 or a last known location of personal item 104 does not match any assigned safe zones, processing component 112 may be configured to generate an alert for display by display component 120 of computing device 102. Such an alert is shown in FIG. 6 at 600. In some embodiments, if processing component determines that a current location of computing device 102 is not a safe zone, processing component may then determine a last known location of personal item 104. Such a determination may be made by periodically recording times when computing device 102 is in communication with personal item 104 and determining a location of computing device 102 at the time when computing device 102 was no longer in communication with personal item 106 and determining this location to be a location of personal item 106.

Consider an example where personal item 104 corresponds to a user's laptop and computing device 102 corresponds to a user's mobile device. If the user leaves their laptop in user office 210, as the user leaves user office 210 with mobile device in hand, the wireless communications between the mobile device and the laptop will be disrupted and lost. However, since user office 210 has been automatically assigned as a safe zone labeled as "OFFICE" based on method 500, no alert will be generated. If the user brings their laptop to the employee lounge 214, and then accidentally leaves it there, as the user leaves the micro PoR of employee lounge 214 and alert 600 may be displayed reminding the user to remember the laptop.

Consistent with some embodiments, the user may have options for responding to a generated alert. As shown in FIG. 6, the user may set a reminder 602 for the alert to repeat a predetermined amount of time later. The user may set a reminder 604 for the alert to repeat after the user leaves the location. According to some embodiments, the location may correspond to the macro PoR in which the current micro PoR is in. For example, reminder 604 may allow the user to receive another reminder if the user leaves macro PoR 200, such that if the wireless communications between the mobile device and the laptop are still not present when the mobile device determines that the user is no longer in macro PoR 200, alert 600 will again be presented to the user. Reminder 604 may allow the user to set a geofence around the current area, such that alert 600 will be presented to the user if the mobile device is determined to be outside of the geofence. The geofence may have a radius set by the user, or may be a predetermined radius, such as 10 m.

According to some embodiments, when presented with alert 600, the user may be able to designate the location as a safe zone 606. If user designates the place as a safe zone, computing device 102 will store this in any of memories 114, 116, and 118, and the current location cluster will be determined to a PoR that is a safe zone for future visits. The user may also be able to ignore the alert 608. Although not shown in FIG. 6, alert 600 may also provide information such as the last known location of personal item 104, which in this example is a laptop. The last known location may be provided as latitude and longitude coordinates, or a labeled place of relevance, such as "WORK" or "EMPLOYEE LOUNGE". Alert 600 may also provide a location of computing device 102 when wireless communications between computing device 102 and personal item 104 was lost as either coordinates or a labeled PoR.

Figure 7:
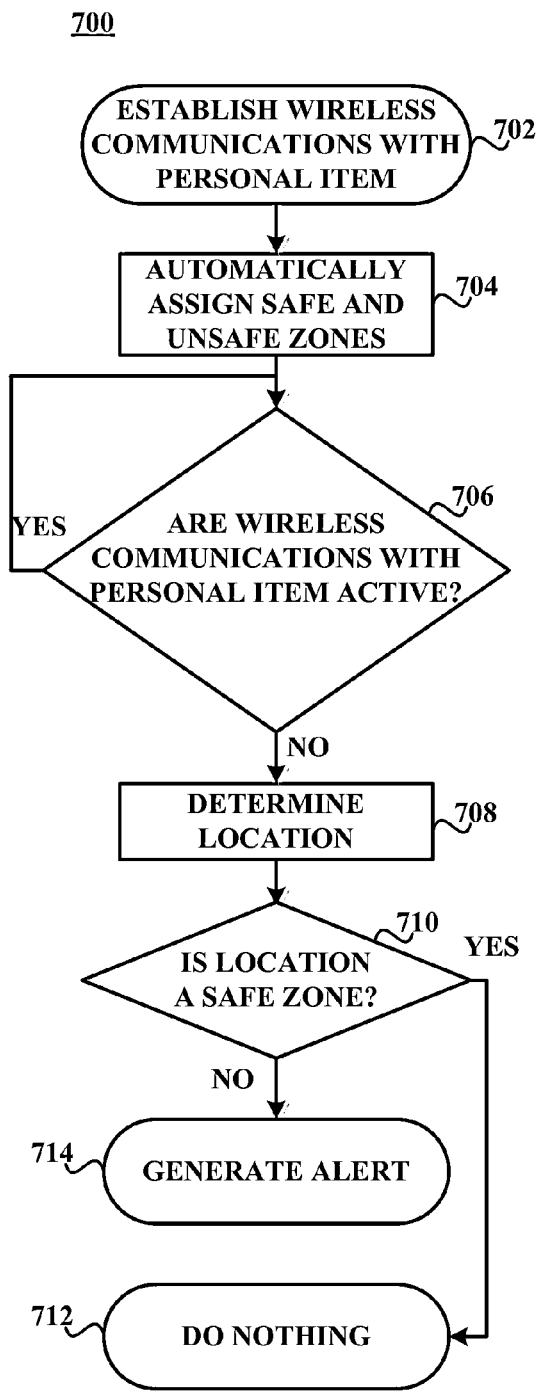
FIG. 7 is a flowchart illustrating a method for monitoring proximity of a personal item, consistent with some embodiments.

FIG. 7 is a flowchart illustrating a method for monitoring proximity of a personal item, consistent with some embodiments. For the purpose of illustration, FIG. 7 will be described with reference to any of FIGS. 1-6. The method shown in FIG. 7 may be embodied in computer-readable instructions for execution by one or more processors in processing component 112 of computing device 102. As shown in FIG. 7, method 700 begins by establishing wireless communications with personal item 104 (702). According to some embodiments, wireless communications with personal item 104 may include Bluetooth™ communications, Zigbee™ communications, or WiFi communications. In some embodiments, input may be required on both computing device 102 and personal item 104 for establishing wireless communications. Such input may include a password or other security credential. Moreover, wireless communications may have a predetermined range such that the established wireless communications may be disrupted and lost if computing device 102 and personal item 104 are separated by a distance greater than the predetermined range.

Method 700 continues as "SAFE" and "UNSAFE" zones are automatically assigned based on clustered locations (704). Consistent with some embodiments, "SAFE" and "UNSAFE" zones may be automatically assigned by processing component 112 executing instructions in any of memories 114, 116, and 118 for performing method 500 shown in FIG. 5. The wireless communications with personal item 104 may then be continually monitored (706). According to some embodiments, wireless communications with personal item 104 may be monitored by sensors 128 and/or wireless transceivers 110 in communication with processing component 112. If it is determined that wireless communications with personal item 104 has been disrupted and lost, a location of computing device 102 is determined (708). According to some embodiments, the location of computing device 102 may be determined by location sensor 128 in communication with processing component 112. In some embodiments, a location of computing device 102 may be determined periodically by location sensor 128 and/or wireless transceivers 110, and processing component 112 may determine the location of computing device 102 as the last periodic location recorded and stored in any of memories 114, 116, and 118.

Method may then determine if the location is a "SAFE" zone (710). As noted above, "SAFE" zones and "UNSAFE" zones may be automatically determined in step 704 according to method 500 shown in FIG. 5. If the location is determined to be a "SAFE" zone, no action is taken (712). However, if the location is determined to not be a "SAFE" zone, an alert may be generated (714). Consistent with some embodiments, alert may correspond to alert 600 shown in FIG. 6. Moreover, a user of computing device 102 may respond to the generated alert similarly to alert 600. That is, user may choose to ignore the alert, ask for a reminder based on a time duration or a geofence, and designate the location as a "SAFE" zone. In some embodiments, if the location is determined to not be a "SAFE" zone, processing component 112 may determine a location of computing device 102 just prior to the communications with personal item 104 being disrupted and lost. If this prior location is determined to be a "SAFE" zone, then an alert may not be generated. However, if this prior location is determined to not be a "SAFE" zone, an alert may be generated.

Software, in accordance with the present disclosure, such as program code and/or data, may be stored on one or more machine readable mediums, including non-transitory machine readable medium such as any of memories 114, 116, and 118 in computing device 102. It is also contemplated that software identified herein may be implemented using one or more general purpose or specific purpose computers or application specific integrated circuits (ASICs) and/or computer systems, networked and/or otherwise. Where applicable, the ordering of various steps described herein may be changed, combined into composite steps, and/or separated into sub-steps to provide features described herein.

Consequently, embodiments as described herein may provide systems and methods for allowing a user to monitor a proximity of a personal item by establishing wireless communications with the personal item and then alerting the user when the wireless communications are disrupted and lost. Moreover, systems and methods provided herein may also automatically assign safe zones and unsafe zones based on a user's location clusters, so that a user may be alerted when the wireless communications are disrupted and lost in unsafe zones, but not in safe zones. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A device for monitoring a proximity of a personal item, comprising:
   one or more wireless transceivers configured to communicate wirelessly with the personal item;
   a location sensor configured to determine a location of the device;
   a memory, the memory configured to store a plurality of locations determined by the location sensor; and
   one or more processors configured to:
     cluster the plurality of determined locations stored in the memory into location clusters;
     automatically assign one or more safe zones based on the clustering, including:
       (1) automatically determining a macro location cluster including some of the plurality of locations at which the device is located for a first amount of time during a time period;
       (2) automatically determining a micro location cluster including at least one of the locations within the macro location cluster at which the device is located for a second amount of time during the time period, the second amount of time being greater than the first amount of time; and
       (3) automatically assigning one of the one or more safe zones to the micro location cluster;
       (4) determining a home location cluster including some of the plurality of locations;
       (5) determining a work location cluster including some of the plurality of locations;
       (6) determining an office location cluster including some of the plurality of locations, wherein determining a work location cluster comprises determining a latitude and longitude data point cluster in which the computing device spends a second greatest amount of time during a day; and
       (7) assigning the home location cluster and the office location cluster as respective ones of the one or more safe zones;
     determine if wireless communications between the device and the personal item are lost and if the device is not in one of the one or more safe zones; and
     generate an alert based on wireless communications between the device and the personal item being lost while the device is not in one of the one or more safe zones.

2. The device of claim 1, wherein the one or more wireless transceivers are configured to:
   communicate wirelessly with the personal item using a wireless communications protocol that has a predetermined range such that when the personal item and the device are separated by a distance greater than the predetermined range the wireless communications between the personal item and the device are lost.

3. The device of claim 1, wherein the location sensor comprises at least one of a global positioning systems (GPS) sensor and a wireless network fingerprint sensor.

4. The device of claim 3, wherein the macro location cluster is a cluster of GPS sensor readings or wireless network fingerprint readings and the micro location cluster is a cluster of wireless network fingerprint readings.

5. The device of claim 4, wherein the one or more processors are configured to generate an alert based on wireless communications between the device and the personal item being lost while the device is located at a second micro location cluster within the macro location cluster, the second micro location cluster including at least one of the locations within the macro location cluster.

6. The device of claim 1, wherein the one or more processors are further configured to:
   store in the memory a determined location of the device at a time the wireless communications between the device and the personal item is lost; and
   associate the determined location of the device at the time the wireless communications between the device and the personal item is lost with the alert.

7. The device of claim 1, wherein the alert allows a user of the device to enter a response to the alert, the one or more processors being further configured to take action based on the response.

8. The device of claim 7, wherein the action comprise at least one of:
   generate a reminder after a predetermined amount of time;
   generate a reminder when the device leaves a geofenced area;
   ignore the alert; or
   assign the zone as being a safe zone of the one or more safe zones.

9. A method for monitoring proximity of a personal item, comprising:
   establishing, by wireless transceivers of a computing device, wireless communications with the personal item;
   automatically assigning, by one or more processors of the computing device, safe zones based on a plurality of locations at which the computing device has been, including:
   (1) automatically determining a macro location cluster including some of the plurality of locations at which the device is located for a first amount of time during a time period;
   (2) automatically determining a micro location cluster including at least one of the locations within the macro location cluster at which the device is located for a second amount of time during the time period, the second amount of time being greater than the first amount of time;
   (3) automatically assigning one of the one or more safe zones to the micro location cluster;
   (4) determining a home location cluster including some of the plurality of locations;
   (5) determining a work location cluster including some of the plurality of locations;
   (6) determining an office location cluster including some of the plurality of locations, wherein determining a work location cluster comprises determining a latitude and longitude data point cluster in which the computing device spends a second greatest amount of time during a day; and
   (7) assigning the home location cluster and the office location cluster as respective ones of the one or more safe zones;
   monitoring the wireless communications with the personal item;
   based on wireless communications between the device and the personal item being lost, determining a location and generating an alert when the determined location is not within a safe zone of the assigned one or more safe zones; and
   associating the determined location with the alert.

10. The method of claim 9, wherein establishing wireless communications with the personal item comprises establishing wireless communications using a wireless communications protocol that has a predetermined range such that when the personal item and the computing device are separated by a distance greater than the predetermined range the wireless communications between the personal item and the computing device are lost.

11. The method of claim 9, wherein determining a home location cluster comprises determining a latitude and longitude data point cluster in which the computing device is located at for a greatest amount of time during a day.

12. The method of claim 9, wherein determining an office location cluster comprises determining a wireless network fingerprint data cluster within the determined work location cluster in which the computing device is spends a greatest amount of time during a day.

13. The method of claim 9, wherein generating the alert includes options for allowing a user of the computing device to schedule a reminder alert to be generated after a predetermined amount of time or when the computing device is determined to have left a geofenced area.

14. A method, comprising:
   determining, by one or more processors of a computing device, a home location cluster;
   determining, by the one or more processors, a work location cluster;
   automatically determining, by the one or more processors, an office location cluster within the work location cluster, the office location cluster being a cluster of locations within the work location cluster that the device is in, from among the locations within the work location, for a greatest amount of time during a time period;
   assigning the home location cluster and the office location cluster as safe zones;
   generating an alert based on wireless communications between the computing device and a personal item being lost and the computing device is not located in a safe zone of the assigned safe zones;
   determining a location of the device at a time the wireless communications between the computing device and the personal item is lost; and
   associating the determined location of the device at the time the wireless communications between the device and the personal item is lost with the alert.

15. The method of claim 14, wherein determining the home location cluster comprises determining a latitude and longitude data point cluster in which the computing device is located at for a greatest amount of time during a day.

16. The method of claim 15, wherein determining the work location cluster comprises determining a latitude and longitude data point cluster in which the computing device spends a second greatest amount of time during the day.

17. The method of claim 16, wherein determining the office location cluster comprises determining a wireless network fingerprint data cluster within the determined work location cluster in which the computing device spends a greatest amount of time, from among the locations within the work location, during the day.

18. The method of claim 16, wherein determining the office location cluster comprises determining a wireless network fingerprint data cluster within the determined work location cluster that the computing device most frequently enters first after the computing device enters the determined work location cluster.

19. The method of claim 16, wherein determining the office location cluster comprises determining a wireless network fingerprint data cluster within the determined work location cluster that the computing device most frequently leaves before the computing device leaves the determined work location cluster.

20. A system for monitoring proximity of a personal item, comprising:
    means for determining a home location cluster;
    means for determining a work location cluster;
    means for automatically determining an office location cluster within the work location cluster, the office location cluster being a cluster of locations within the work location cluster that the device is located, from among the locations within the work location, for a greatest amount of time during a time period;
    means for assigning the home location cluster and the office location cluster as safe zones; and
    means for generating an alert based on wireless communications between the system and the personal item being lost and the system is not located in a safe zone of the assigned safe zones;
    means for determining a location of the device at a time the wireless communications between the computing device and the personal item is lost; and
    means for associating the determined location of the device at the time the wireless communications between the device and the personal item is lost with the alert.

21. The system of claim 20, wherein the means for determining the home location cluster is configured to determine a latitude and longitude data point cluster in which the system is located for a greatest amount of time during a day.

22. The system of claim 21, wherein the means for determining the work location cluster is configured to determine a latitude and longitude data point cluster in which the computing device spends a second greatest amount of time, from among the locations within the work location, during the day.

23. The system of claim 22, wherein the means for determining the office location cluster is configured to determine a wireless network fingerprint data cluster within the determined work location cluster in which the computing device spends a greatest amount of time during a day.

24. The system of claim 22, wherein the means for determining the office location cluster is configured to determine a wireless network fingerprint data cluster within the determined work location cluster that the system most frequently enters first after the system enters the determined work location cluster.

25. The system of claim 22, wherein the means for determining the office location cluster is configured to determine a wireless network fingerprint data cluster within the determined work location cluster that the computing device most frequently leaves before the computing device leaves the determined work location cluster.

26. A non-transitory computer-readable medium including instructions that, when executed by one or more processors of a computing device, cause the computing device to:
    determining a home location cluster;
    determining a work location cluster;
    automatically determining an office location cluster within the work location cluster, the office location cluster being a cluster of locations within the work location cluster that the device is located, from among the locations within the work location, for a greatest amount of time during a time period;
    assigning the home location cluster and the office location cluster as safe zones; and
    generating an alert based on wireless communications between the computing device and a personal item being lost and the computing device is not located in a safe zone of the assigned safe zones;
    determining a location of the device at a time the wireless communications between the computing device and the personal item is lost; and
    associating the determined location of the device at the time the wireless communications between the device and the personal item is lost with the alert.

* * * * *